No. 641,151. Patented Jan. 9, 1900.
C. A. SCHURRER & W. STRAFFON.
EDUCATIONAL APPLIANCE.
(Application filed Sept. 20, 1899.)

(No Model.) 3 Sheets—Sheet 1.

Witnesses:
Wm H Payne
Ona Grube

Inventors:
Charles A. Schurrer.
William Straffon.
By E. T. Silvius,
Attorney.

No. 641,151. Patented Jan. 9, 1900.
C. A. SCHURRER & W. STRAFFON.
EDUCATIONAL APPLIANCE.
(Application filed Sept. 20, 1899.)
(No Model.) 3 Sheets—Sheet 2.
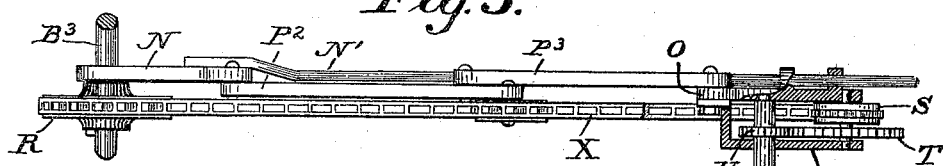
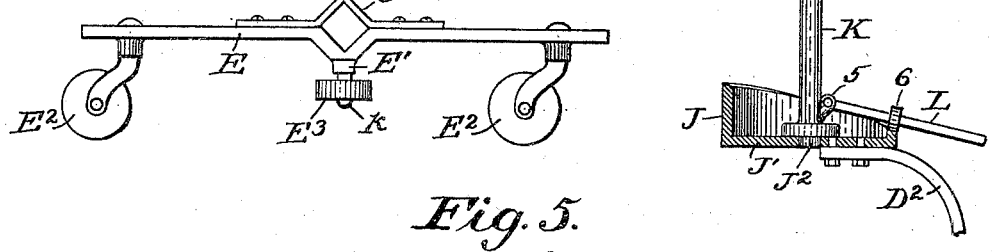
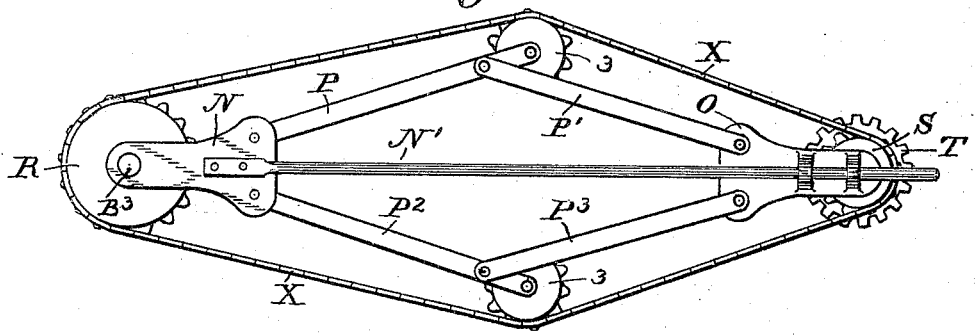
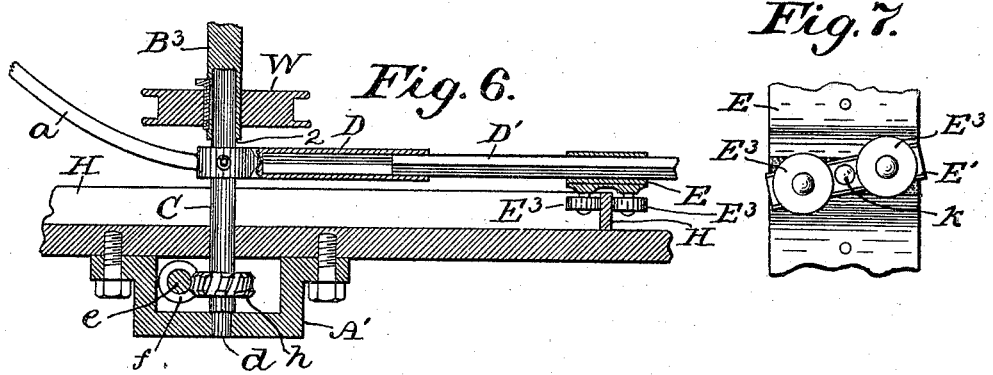
Witnesses:
Wm. H. Payne
Ona Gruk
Inventors:
Charles A. Schurrer
William Straffon
By E. T. Silvius,
Attorney.

No. 641,151. Patented Jan. 9, 1900.
C. A. SCHURRER & W. STRAFFON.
EDUCATIONAL APPLIANCE.
(Application filed Sept. 20, 1899.)
(No Model.) 3 Sheets—Sheet 3.
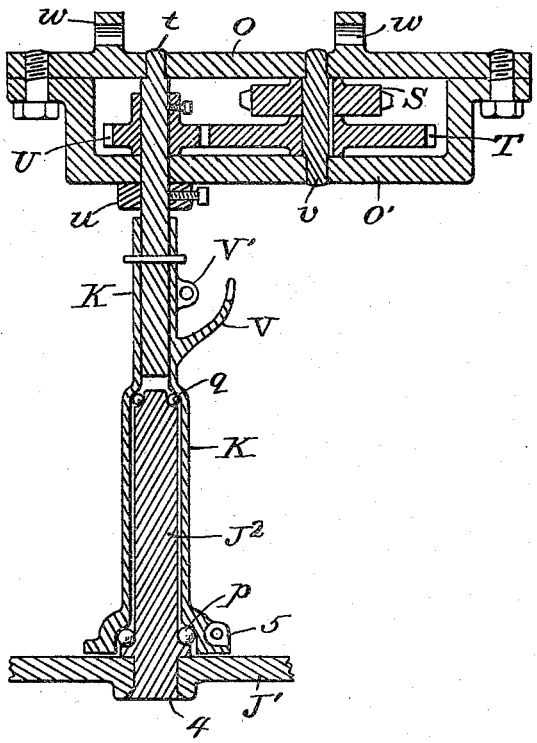
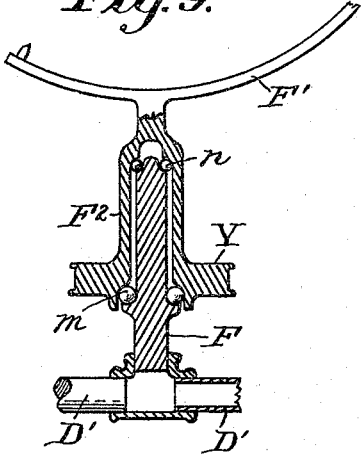
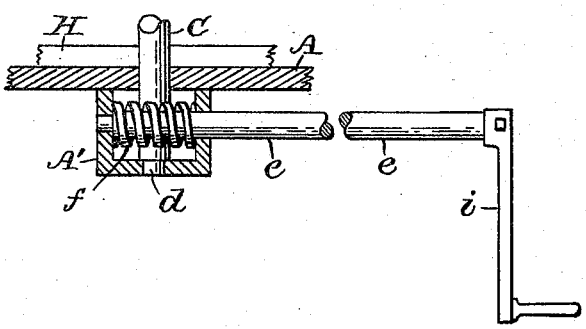
Witnesses:
Inventors:
Charles A. Schurrer.
William Straffon.
By E. T. Silvius,
Attorney.

UNITED STATES PATENT OFFICE.

CHARLES A. SCHURRER, OF LAKEPORT, AND WILLIAM STRAFFON, OF OTTO, MICHIGAN.

EDUCATIONAL APPLIANCE.

SPECIFICATION forming part of Letters Patent No. 641,151, dated January 9, 1900.

Application filed September 20, 1899. Serial No. 731,057. (No model.)

*To all whom it may concern:*

Be it known that we, CHARLES A. SCHURRER, residing at Lakeport, in the county of St. Clair, and WILLIAM STRAFFON, residing at Otto, in the county of Sanilac, State of Michigan, citizens of the United States, have invented certain new and useful Improvements in Educational Appliances; and we do declare the following to be a full, clear, and exact description of the invention, such as will enable others skilled in the art to which it appertains to make and use the same, reference being had to the accompanying drawings, and to the letters and numerals of reference marked thereon, which form a part of this specification.

Our invention relates to appliances that are adapted to be employed generally for educational purposes, but particularly in the school-room; and it consists in an apparatus embracing both movable and attachable parts, whereby may be explained the cause of the recurrence of the seasons of the year, the causes of the different phases of the moon, and the causes of the eclipses of both the sun and the moon; and it consists, further, in the parts and combination and arrangement of parts hereinafter described, and pointed out in the claims.

Our object is to provide appliances of this character adapted for school and general instruction which may be produced inexpensively and be free from intricacies in adjustment, so as to not require expert manipulation, and which shall not be liable to disarrangement under the conditions usually prevailing where such apparatus is used.

In the interest of brevity we have applied to our appliance or machine the name of "Terrascope," which is illustrated in the accompanying drawings and hereinafter described more particularly.

Figure 1:
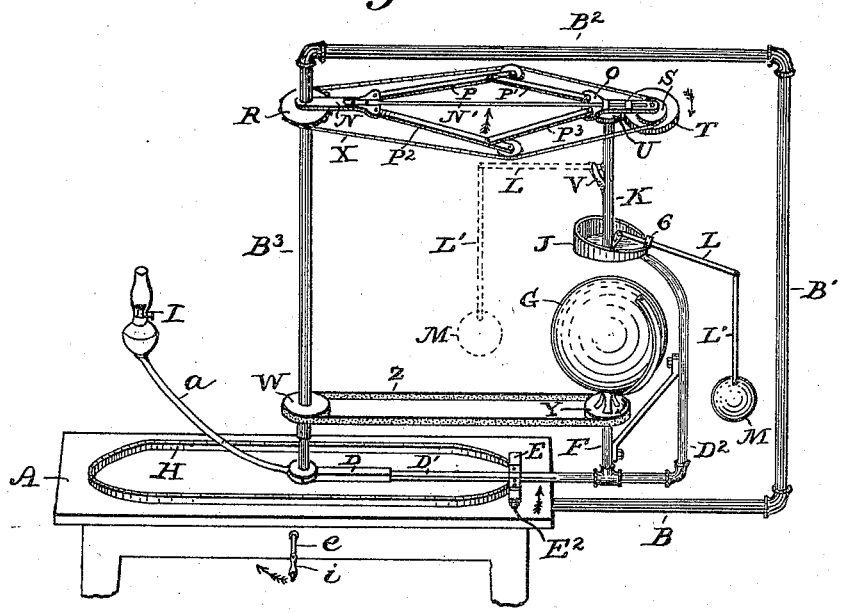
Figure 2:
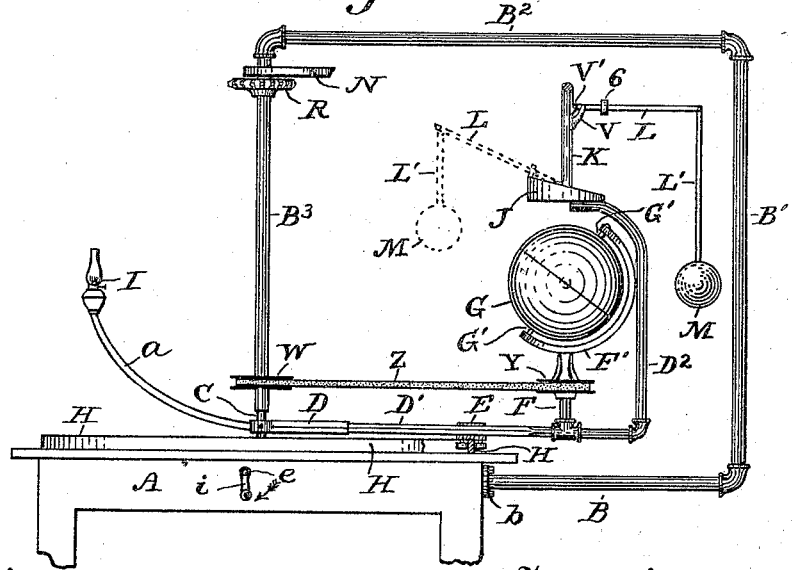

Referring to the drawings, Figure 1 represents a front perspective of our invention; Fig. 2, a front elevation; Fig. 3, an enlarged detail view of the upper portion of the appliances; Fig. 4, a side elevation of the carriage; Fig. 5, a top plan of the compensating frame; Fig. 6, a fragmentary sectional view showing details of construction; Fig. 7, a fragmentary bottom plan of the carriage, showing the swiveled portion thereof; Fig. 8, an enlarged sectional detail view of the upper portion of the appliances; Figs. 9 and 10, enlarged detail views of parts in section.

Similar letters and numerals of reference in the several figures designate similar parts throughout the drawings.

In practically carrying out our invention we employ a table or stand A of any suitable design having a plane top as a base and stable frame, to which we securely attach, as at $b$, a framework comprising a substantially horizontal arm B, a continuing vertical post B', a continuing arm $B^2$, and a depending continuing center post $B^3$, the latter being situate approximately central above the table and extending down to a point near the top thereof and provided at its lower end with a socket 2, providing a journal and bearing at the bottom thereof for the top of the vertical rotating shaft C, mounted in the top of the table and having a lower journal $d$ in a bracket A', secured at the under side of the table-top or to the frame thereof, as may be most convenient. Below the table-top is a toothed wheel $h$, attached to the shaft C, and a suitably-supported horizontal rotating shaft $e$, having a crank $i$ suitably mounted thereon, to which is secured a worm-wheel $f$, engaging the wheel $h$, whereby the machine is manually operated.

From the foregoing it will be understood that the frame B B' $B^2$ $B^3$ is stationary with the stand A and that, if desired, a similar frame may be made supplementary thereto to provide adequate lateral support in large apparatus, the whole being suitably composed of pipe and fittings.

Secured to the shaft C is a horizontal rotating frame operatively connected with an upper frame rotating horizontally therewith about the post $B^3$, both frames being extensible or compensating and adapted to operate while following the path of an ellipse, as will be more fully described in detail.

Upon the top of the table is secured a rail or track H, representing in plan contour the earth's orbit. This track is of suitable height to permit of rollers engaging the sides thereof, and, if desired, the top thereof may be employed as a support for the rotating frame. The shaft C is situate centrally with the track H.

The arm D, comprising a portion of the rotating frame, is hollow and is secured to the shaft C a short distance above the track H and has an oppositely-extending upturned arm $a$, at the extremity of which is a suitable lamp or candle I to represent the solar luminary. Into the arm D is fitted a sliding-arm extension D', at the outer end of which is a continuing vertical member $D^2$, to the top of which is secured a circular inclined track J, to the bottom J' of which is secured a column $J^2$, fitted, preferably, with ball-races at the top and at the lower portion thereof, but essentially as a journal-bearing for the hollow standard K, which rotates thereon, the ball-bearings $p$ and $q$ being desirable, of any suitable form of construction.

The carriage E is adapted to support the rotating frame and is secured to the part D' thereof, as by means of a clamp $l$, and has swiveled casters $E^2 E^2$, and to a pivot $k$ is centrally swiveled a part E', to which is journaled a pair of rollers $E^3 E^3$, which engage the sides of the track H for the purpose of controlling the movement of the earth to conform to its track. The casters move upon the plane top of the table at the outside of the track. The arm D and the extension D', of suitable length, permit of the necessary range as between the shortest and greatest diameter of the track.

At a suitable point upon the frame-piece D' is an upright column F, having a rotating hollow shaft $F^2$, preferably provided with ball-bearings, as $m$ and $n$, and carrying a pulley Y at the lower part and a yoke F' at the top, in which is pivoted a globe representing the earth G. A pulley W, of the same diameter as the pulley Y, is secured to the post $B^3$, so as to be in alinement, and over the pulleys is an elastic belt Z.

Near the top of the post $B^3$ is a sprocket-wheel R, secured thereto, and above the wheel is journaled to the post the compensating or extensible frame comprising the head-piece N, the body-bar N', the tailpiece O, and the connecting pivoted arms P P' $P^2$ $P^3$. The head-piece N is supported upon the wheel R. The bar N' may be made either integrally with the head-piece N or attached thereto, and at its free end it is fitted into and slides in bearings $w$ $w$ upon the top of the tailpiece O. One end of each of the arms P and P' is pivoted to the head-piece N at the sides of the bar N', and to the free ends of the arms sprocket-wheels 3 3 are journaled. The arms P' and $P^3$ are each pivoted at one end to the tailpiece O, and their opposite ends are pivoted to the arms P and $P^2$, respectively, near or at the free ends thereof. The tailpiece O has a lower part O' bolted thereto as a support for the sprocket-wheel S and gear-wheel T, both of which are secured to a shaft $v$, journaled in the tailpiece, the gear-wheel engaging a smaller gear-wheel U, secured to the upper portion $t$ of the standard K, the portion $t$ being journaled in both the upper part O and lower part O' of the tailpiece, so that the standard K shall prevent tilting of the tailpiece as the same is controlled by the standard to follow the track of the earth's orbit. A sprocket-chain X extends over the sprocket-wheels R and S, by which the latter is rotated, and over the wheels 3 3, by which the chain is continuously kept taut, through the operation of the spreading arms. As designed, the sprocket-wheels R and S and gear-wheels T and U are proportioned relatively so that the moon shall make about thirteen revolutions about the earth while the latter traverses its orbit.

The rotating standard K may be constructed in various ways, the form shown being simple and preferable. The inclined circular track J has an integral bottom or base $J^3$, which is bolted to the bent portion of the upright part $D^2$, and to the base the column $J^2$ is fitted and rigidly attached, as by riveting over the lower end. The standard K is fitted revolubly to the column, so that there shall be no lateral play or lost motion. The upper part $t$ may be either made integrally or separately, as shown, and driven in and pinned fast. A collar $u$ is preferably employed to afford ample bearing to support the tailpiece O and parts thereon. At the lower end of the standard is a jaw 5, to which the moon-arm L is pivoted at one end, and a roller 6, journaled on the arm, traverses the track J. At the free end of the arm L the globe representing the moon M is suspended, as by a rod L', pivoted to the arm. This moon-arm L should be so connected by a pintle that it may be readily detached and transferred to the jaw V' and supporting-fork V when it is desired to explain the cause of an eclipse, or a separate arm and moon may be provided, if desired, for this exhibition.

This apparatus is not designed to be accurate in its demonstrations, but rather to be employed only in explaining the causes of the various phenomena, particularly the eclipses, and for this purpose is entirely effective.

In operation the crank $i$ may be manually operated so as to rotate in the direction of the arrows in Figs. 1 and 2, producing a rotation of the arm or beam D of the earth-frame in the direction of the arrow shown in Fig. 1, and in the same figure an arrow on the pulley Y indicates the direction of revolution of the earth upon its axis F. The earth G may be manually rotated upon its other axis G'. The belt Z as it laps around the stationary pulley W causes the pulley Y to rotate, and likewise the earth, to produce the several seasons and inclination and declination of the sun, as commonly understood, the direct rays of the sun bearing successively on every part of the earth between the tropics. In Fig. 1 the arrow indicates a corresponding movement of the upper frame, the stationary wheel R causing the wheels S and T to rotate in the direction of the arrow, while the standard K rotates in the opposite direction, carrying the moon with it, the latter rising and falling in its travel by reason of the inclined track J. A reverse movement of the crank $i$ obviously produces a reversal of the above-described motions. In Fig. 1, in dotted lines, the moon is shown in conjunction, illustrating an eclipse of the sun. In Fig. 2 the moon (shown in full lines) is in opposition, illustrating an eclipse of the moon.

Having thus described our invention, what we claim, and desire to secure by Letters Patent, is—

1. An appliance comprising a base, a revoluble center shaft, a center post having a journal-bearing at the top of the center shaft, a framework supported by the base and laterally supporting the center post, a rotating frame attached to the center shaft and having an extensible portion on which is mounted a rotating frame carrying a globe revoluble on an inclined axis and also a vertical portion extending above the globe and carrying an inclined track central above the globe, a carriage attached to the extensible portion of the rotating frame, an elliptical guide for the carriage, an arm carried by the rotating frame attached to the center shaft and a solar representative mounted thereon, a standard revoluble above the inclined track, an arm pivoted to the standard, a globe carried by the pivoted arm, and a frame and gearing carried by the standard thereby operatively connecting the revoluble standard with the center post.

2. An appliance comprising a base, a stationary center post, a revoluble center shaft journaled in the base and in the bottom of the center post, a frame supporting the top of the center post, an extensible frame secured to the center shaft and having an arm carrying a representative of the sun, a carriage attached to the extensible frame, an elliptical guide for the carriage, an earth-globe mounted on the extensible frame, a circular inclined track mounted above the earth-globe, a standard revolubly mounted above the inclined track, a moon-globe carried by the standard, means whereby the standard is rotated when carried about the center post, and means whereby the earth-globe is caused to rotate about a vertical axis when carried about the center post.

3. In an educational appliance, the combination of a base, a stationary frame, a stationary center post, a revoluble center shaft, an elliptical track, an extensible rotating frame secured to the center shaft, means whereby the extensible frame is operated longitudinally, an earth-globe carried by the extensible frame, a standard carried by the extensible frame, a moon-globe carried by the standard, means whereby the moon-globe may be controlled either in an inclined orbit or in a horizontal orbit, an extensible or compensating frame mounted upon the standard and connected revolubly to the center post, and gearing connecting the standard operatively to the center post whereby the standard is caused to rotate.

4. In an educational appliance, the combination of a base, a stationary frame, a stationary center post, a revoluble center shaft, an elliptical track, a pulley secured to the center post, an extensible rotating frame secured to the center shaft, a revoluble globe mounted upon the extensible frame and provided with a pulley fixed to the globe-frame, an elastic belt engaging such pulleys whereby the globe is rotated, an arm attached to the rotating frame, a representation of the sun mounted upon such arm, and a globe and means whereby the same is supported and caused to rotate about such revoluble globe.

5. In an educational appliance, the combination of a base, a stationary frame, a stationary center post, a revoluble center shaft, an elliptical track, a pulley secured to the center post, an extensible rotating frame secured to the center shaft, means whereby the outer end of the extensible frame is caused to follow the path of the elliptical track, a globe mounted revolubly on the extensible frame and provided with a pulley, an elastic belt engaging such pulleys whereby such globe is rotated, a representation of the sun suitably supported, a circular inclined track mounted on the extensible frame and above the revoluble globe, a standard mounted revolubly at the center of the circular track and carrying an arm bearing upon the inclined track, a globe supported by such arm, an upper compensating extensible frame revoluble about the center post and carrying a sprocket-wheel and gear-wheels operated thereby, a sprocket-wheel secured to the center post, a chain connecting such sprocket-wheels, said standard being rotated by said gear-wheels, substantially as set forth.

6. In an educational appliance, the combination of a stationary center post, a revoluble center shaft, a pulley secured to the center post, a rotating frame mounted upon the center shaft and having an arm extending at the opposite side of the center shaft, a representation of the sun on such arm, a revoluble globe mounted in a revoluble frame upon the rotating frame, a pulley secured to the frame in which the globe is mounted, an elastic belt connecting such pulleys, a standard carried by the rotating frame and revolubly mounted, a globe supported by the standard, a gear-wheel secured to the standard, an upper frame mounted on the center post and adapted to be rotated about the post by the rotating frame carrying the revoluble globe, and gearing whereby the standard is rotated through the medium of the gear-wheel thereon, substantially as set forth.

7. In an educational appliance, the combination of the table, the elliptical track, the center post, the center shaft, the rotating extensible frame, the lamp, the earth-globe, the inclined circular track, the moon-globe, the standard carried by the rotating frame and revoluble at the center of the inclined track, the carriage supporting and controlling the rotating extensible frame, the pulley attached to the center post, the pulley attached to the earth-globe frame, the elastic belt connecting said pulleys, the arm detachably connected to the standard, the moon-globe supported by such arm, the gear-wheel secured to such standard, the sprocket-wheel attached to the center post, the upper compensating frame controlled laterally by said standard, the sprocket-wheel on said compensating frame, the gear-wheel operated by said last-mentioned sprocket-wheel and engaging the gear-wheel on said standard, and the chain connecting said two sprocket-wheels, substantially as set forth.

8. In an educational appliance, the combination of the table, the elliptical track, the center shaft, the gear-wheel $h$, the shaft $e$, the worm $f$, the crank, the center post having the shaft journaled in the lower end thereof, the frame supporting the center post, the rotating extensible frame having the arm $a$, the lamp, the carriage E, the column F and the rotating globe thereon, the pulley Y, the pulley W, the elastic belt connecting said pulleys, the inclined circular track on the rotating frame, the detachable arm L, the globe supported by said arm, the standard mounted revolubly at the center of said inclined track and carrying said arm over said inclined track, the devices whereby said arm may be attached elsewhere to said standard, the wheel U, the wheel R, the wheel S and connected wheel T engaging said wheel U, the chain X, and the compensating frame whereby said chain is maintained taut and adapted to be controlled laterally by said standard, substantially as set forth.

In testimony whereof we affix our signatures in presence of two witnesses.

CHARLES A. SCHURRER.
WILLIAM STRAFFON.

Witnesses:
JNO. P. NIGGEMAN, Jr.,
E. M. DIXON.